United States Patent
Kimura et al.

(10) Patent No.: US 10,147,179 B2
(45) Date of Patent: Dec. 4, 2018

(54) ACTION INSTRUCTION APPARATUS

(71) Applicant: HITACHI, LTD., Tokyo (JP)

(72) Inventors: Ryusuke Kimura, Tokyo (JP); Kei Imazawa, Tokyo (JP); Takaharu Matsui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 14 days.

(21) Appl. No.: 15/455,405

(22) Filed: Mar. 10, 2017

(65) Prior Publication Data
US 2018/0033130 A1 Feb. 1, 2018

(30) Foreign Application Priority Data

Aug. 1, 2016 (JP) ................. 2016-151068

(51) Int. Cl.
*G06K 9/00* (2006.01)
*G06T 7/00* (2017.01)
*G06K 9/46* (2006.01)
*G06K 9/62* (2006.01)
(Continued)

(52) U.S. Cl.
CPC .......... *G06T 7/001* (2013.01); *G06K 9/00771* (2013.01); *G06K 9/4604* (2013.01); *G06K 9/4642* (2013.01); *G06K 9/6201* (2013.01); *G06K 9/6202* (2013.01); *G09B 19/24* (2013.01); *G06T 2207/10016* (2013.01); *G06T 2207/10024* (2013.01); *G06T 2207/30108* (2013.01);
(Continued)

(58) Field of Classification Search
CPC ............. G06K 9/00771; G06K 9/4604; G06K 9/4642; G06K 9/6201; G06K 9/6202; G06T 2207/30164; G06T 2207/30196; G06T 7/001; G09B 19/24; G09B 5/02
See application file for complete search history.

(56) References Cited

U.S. PATENT DOCUMENTS

2006/0074514 A1* 4/2006 Mukai ................ G05B 19/4069
700/177
2011/0288660 A1* 11/2011 Wojsznis ............. G05B 23/024
700/30
(Continued)

FOREIGN PATENT DOCUMENTS

JP          2015-056160 A          3/2015

*Primary Examiner* — Amara Abdi
(74) *Attorney, Agent, or Firm* — Baker Botts L.L.P.

(57) ABSTRACT

Provided is a technology for recovery from an abnormality of an action of a worker. An action instruction apparatus includes: a standard operating procedure storing unit configured to store, for each operation step, output information from a predetermined sensor relating to a standard action of a worker; an operation step identifying unit configured to acquire output information from a sensor and to compare the acquired output information with the standard action to identify an operation step being performed; an operation abnormality detecting unit configured to acquire output information from a sensor relating to an operation step subsequent to the operation step being performed by the worker to detect an operation abnormality when the acquired output information differs from the output information in the operation step subsequent to the operation step being performed; and a recovery action instruction generating unit configured to generate an operation instruction detail for recovery.

7 Claims, 13 Drawing Sheets

(51) Int. Cl.
*G09B 19/24* (2006.01)
*G09B 5/02* (2006.01)

(52) U.S. Cl.
CPC ............ *G06T 2207/30164* (2013.01); *G06T 2207/30196* (2013.01); *G09B 5/02* (2013.01)

(56) References Cited

U.S. PATENT DOCUMENTS

| | | | |
|---|---|---|---|
| 2012/0212582 A1* | 8/2012 | Deutsch ............... | G08B 21/245 348/46 |
| 2015/0253766 A1* | 9/2015 | Pettersson .......... | G05B 19/4187 700/168 |

* cited by examiner

FIG. 3

OPERATION DETAIL ACQUISITION
MODEL STORING UNIT                                42

| FRAME | BRIGHTNESS OF CAMERA 1 | NUMBER OF CORNERS OF CAMERA 1 | ... | MAXIMUM TEMPERATURE OF TEMPERATURE SENSOR 1 | ... |
|---|---|---|---|---|---|
| 1 | 200 | 60 | ... | 200 | ... |
| 2 | 180 | 100 | ... | 200 | ... |
| 3 | 150 | 150 | ... | 250 | ... |
| ... | ... | ... | ... | ... | ... |

PART/TOOL RETRIEVAL MODEL STORING UNIT  43

| ITEM ID | COLOR | BRIGHTNESS | IDENTIFICATION ALGORITHM |
|---|---|---|---|
| 1 | 40 | 120 | FuncA |
| 2 | 180 | 112 | FuncB |
| 3 | 105 | 40 | FuncC |
| ... | ... | ... | ... |

FIG. 5

RECOVERY ACTION INSTRUCTION GENERATION MODEL STORING UNIT ~45

| RECOVERY ID | ACTION | RECOVERY INSTRUCTION SENTENCE GENERATION RULE |
|---|---|---|
| 1 | TAKE | REPLACE "TAKE" WITH "RETURN" AND "FROM" WITH "TO" |
| 2 | TIGHTEN SCREW | REPLACE "TIGHTEN SCREW" WITH "REMOVE SCREW" AND "ATTACH ... TO" WITH "DETACH ... FROM" |
| ... | ... | ... |

RECOVERY ACTION INSTRUCTION STORING UNIT 46

| DISPLAY ORDER | ACTION INSTRUCTION | ACTION EXECUTION CONFIRMATION ALGORITHM |
|---|---|---|
| 1 | RETURN PART B | Func Z |
| 2 | RETURN PART A | Func Y |
| 3 | TAKE PART C | Func X |
| ... | ... | ... |

OPERATION OBJECT STORING UNIT

| OPERATION ID | OBJECT | OPERATION COMPLETED STATE FEATURE AMOUNT |
|---|---|---|
| 1 | APPARATUS A | BRIGHTNESS: XX, NUMBER OF CORNERS: YY |
| 2 | NONE | NONE |
| 3 | APPARATUS A | BRIGHTNESS: PP, NUMBER OF CORNERS: QQ |
| ... | ... | ... |

ACTION INSTRUCTION APPARATUS

INCORPORATION BY REFERENCE

This application claims the priority based on Japanese Patent Application No. 2016-151068 filed on Aug. 1, 2016, the entire contents of which are incorporated herein by reference for all purpose.

BACKGROUND OF THE INVENTION

The present invention relates to an action instruction apparatus.

Japanese Patent Laid-open Publication No. 2015-56160 is known as background art of the technical field of the present invention. In this publication, there is disclosed a production management system including means for changing an operation step based on operation results of a plurality of operation steps.

SUMMARY OF THE INVENTION

The technology disclosed in Japanese Patent Laid-open Publication No. 2015-56160 focuses on recovery implemented by re-performing an operation step corresponding to a shortage caused by a defect or the like, and no measure is taken into consideration regarding an abnormality of an action of a worker causing the defect or the like.

It is an object of the present invention to provide a technology capable of enabling recovery from an abnormality of an action of a worker.

This application includes a plurality of means for solving at least part of the above-mentioned problem, and an example of the plurality of means is as follows. In order to solve the above-mentioned problem, according to one embodiment of the present invention, there is provided an action instruction apparatus, including: a standard operating procedure storing unit configured to store, for each operation step, output information from a predetermined sensor relating to a standard action of a worker; an operation step identifying unit configured to acquire output information from the predetermined sensor relating to an operation being performed by the worker and to compare the acquired output information with the standard action stored in the standard operating procedure storing unit to identify an operation step being performed; an operation abnormality detecting unit configured to acquire output information from the predetermined sensor relating to an operation step subsequent to the operation step being performed by the worker to detect an operation abnormality when the acquired output information differs from the output information in the operation step subsequent to the operation step being performed; and a recovery action instruction generating unit configured to generate an operation instruction detail for recovery when the operation abnormality is detected.

According to the present invention, it is possible to enable the recovery from the abnormality of the action of the worker. Problems, configurations, and effects other than those described above are made clear from the following description of an embodiment of the present invention.

BRIEF DESCRIPTION OF THE DRAWINGS

FIG. 3 is a table for showing a data structure stored in an operation detail acquisition model storing unit.

FIG. 4 is a table for showing a data structure stored in a part/tool retrieval model storing unit.

FIG. 5 is a table for showing a data structure stored in a recovery action instruction generation model storing unit.

FIG. 6 is a table for showing a data structure stored in a recovery action instruction storing unit.

DESCRIPTION OF THE PREFERRED EMBODIMENTS

Figure 1:
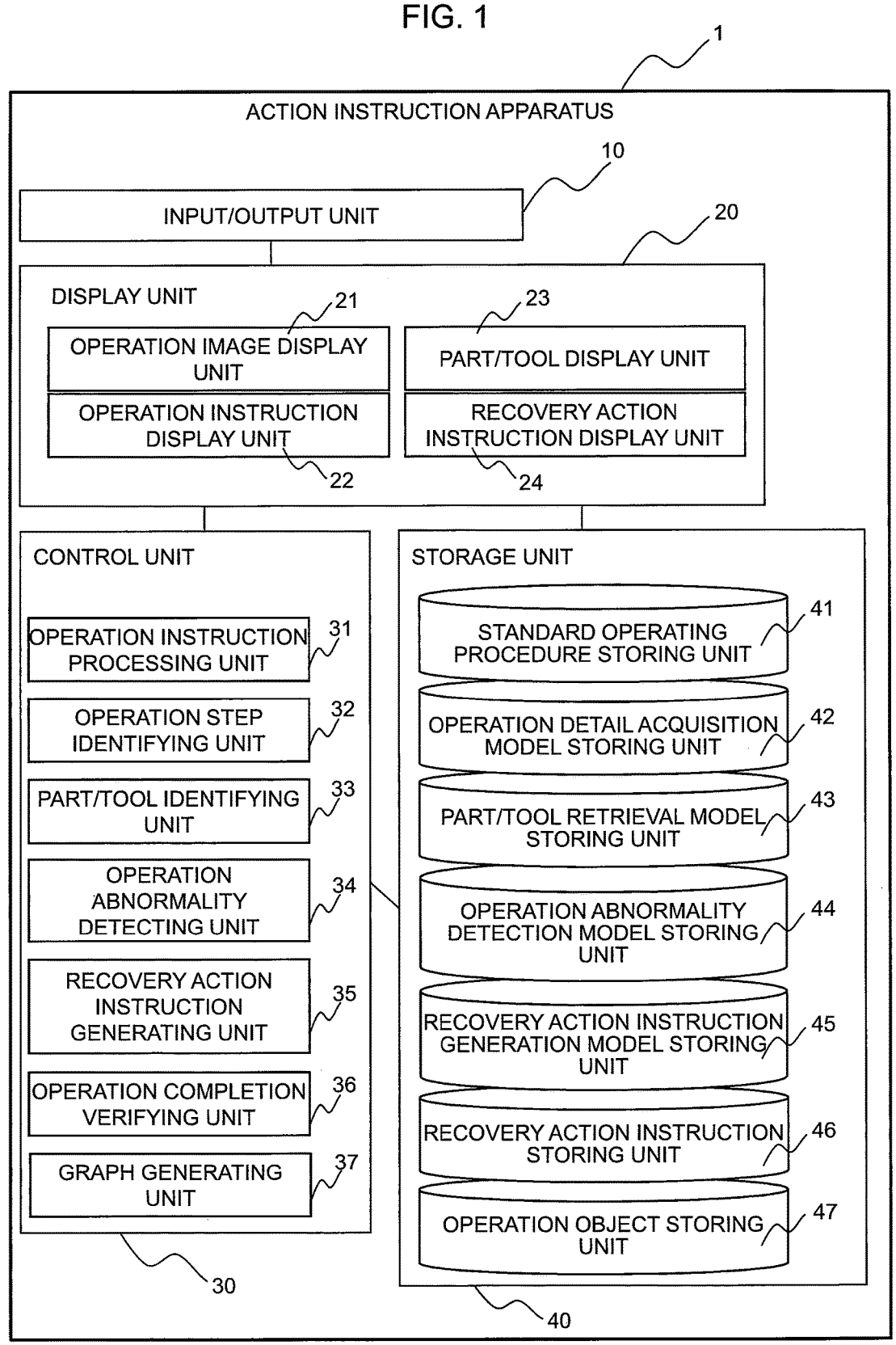
FIG. 1 is a diagram for illustrating a configuration of an action instruction apparatus according to a first embodiment of the present invention.

One embodiment of the present invention is now described with reference to the drawings. In all the drawings for illustrating the embodiment, the same parts are denoted by the same reference numeral or symbol as a rule, and overlapping description thereof is omitted. It should be understood that, in the following description of the embodiment of the present invention, a component (including a constituent step) is not always indispensable unless explicitly noted otherwise or unless it is theoretically obvious that the component is indispensable. Further, it is to be understood that when a description "formed of A", "formed by A", "having A", or "including A" is given, those descriptions do not exclude other components unless it is explicitly stated that a certain component includes only that component in particular. Similarly, when the shapes, positional relations, and the like of components are mentioned in the following description of the embodiment of the present invention, shapes and the like that are substantially approximate to or similar to the ones mentioned are included unless explicitly noted otherwise or unless it is theoretically obvious that it is not the case.

In general, at an assembly operation site, a product defect occurs due to an operation abnormality such as omission of an operation or taking a wrong part. Thus, when an operation abnormality occurs, it is effective to detect the operation abnormality and immediately instruct a correction operation for the operation abnormality to prevent occurrence of a product defect. In particular, according to an action instruction apparatus of an embodiment of the present invention, it is possible to reduce product defects and customer complaints caused by an operation abnormality such as omission of an operation or taking a wrong part at an assembly operation site.

FIG. 1 is a diagram for illustrating a configuration of an action instruction apparatus 1 according to the embodiment of the present invention. The action instruction apparatus 1 may be constructed with a general computer (e.g., a PC), and implements characteristic processing of this embodiment through, for example, processing of executing a software program. The action instruction apparatus 1 includes an input/output unit 10, a display unit 20, a control unit 30, a storage unit 40, and a bus.

The input/output unit 10 includes: an input device configured to receive, through operation of a user, for example, an operation manager, input of setting items for a standard operating procedure, a correction operation instruction generation model, and various types of models; and an output device configured to output an operation image, instruction of an operation detail, instruction of a part and tool to be used in an operation, instruction of a correction operation detail, and others. For example, the input/output unit 10 receives input via hardware components such as a keyboard and a mouse and outputs data to a printer.

The input/output unit 10 further includes at least a camera device. In addition, the input/output unit 10 includes various types of other sensor devices suitable for detecting a worker's action, for example, a temperature sensor. In the camera device, there are arranged: an image sensor configured to condense light through use of a lens and form an image onto a light receiving surface of a light receiving element such as a complementary MOS (CMOS) or a charge coupled device (CCD) arranged inside the camera device to acquire the image; and a processing part configured to perform image processing, for example, an integrated circuit (IC). The image processing is, for example, calculation of a distance to an object through use of parallax images acquired from a plurality of lenses. The camera device is arranged so as to have an angle of view with which an image related to an operation of a user being the worker can be appropriately acquired. In this embodiment, for example, the camera device is arranged so as to include, as its angle of view, a region on an operation table used by the user being the worker, which is viewed from above the head of the user being the worker.

The display unit 20 is configured to construct a screen to be displayed on a display or the like through use of a graphical user interface (GUI) to display various types of information. The display unit 20 includes an operation image display unit 21, an operation instruction display unit 22, a part/tool display unit 23, and a recovery action instruction display unit 24. The operation image display unit 21 is configured to display an image of the worker's operation, which is acquired from the camera and other sensors. The operation instruction display unit 22 is configured to display a sentence instructing an operation detail in accordance with control of an operation instruction processing unit 31 described later. The part/tool display unit 23 is configured to display a part and a tool identified by a part/tool identifying unit 33 described later after superimposing the part and tool onto positions on the operation image. The recovery action instruction display unit 24 is configured to display a sentence instructing a recovery action when an operation abnormality detecting unit 34 described later detects an operation abnormality. By seeing the display unit 20, the user being the worker can take a measure to solve an operation abnormality such as omission of an operation or taking a wrong part at an assembly operation site based on the output on the display unit 20. With this configuration, product defects and customer complaints caused by the operation abnormality can be reduced.

The control unit 30 includes the operation instruction processing unit 31, an operation step identifying unit 32, the part/tool identifying unit 33, the operation abnormality detecting unit 34, a recovery action instruction generating unit 35, an operation completion verifying unit 36, and a graph generating unit 37.

The operation instruction processing unit 31 is configured to acquire from a standard operating procedure storing unit 41 an operation step to be performed after an operation step identified by the operation step identifying unit 32 described later, and cause the operation instruction display unit 22 to display the acquired operation step.

The operation step identifying unit 32 is configured to use data acquired by the camera and other sensors to identify the worker's current action and compare the identified current action with the standard operating procedure stored in the standard operating procedure storing unit 41, to thereby identify an operation step being performed. For example, the operation step identifying unit 32 acquires image feature amounts such as brightness and the number of corners (number of edges) for each frame of image data taken by the camera, and identifies as the current action an action found to be similar to feature amounts defined in the standard operating procedure. The image feature amounts are desirably, for example, histograms of oriented gradients (HOG) feature amounts. However, the image feature amounts are not limited thereto, and may be feature amounts of another type.

The part/tool identifying unit 33 is configured to use data acquired by the camera and other sensors to determine and identify a part and tool contained in the data, and identify a part and tool to be used in the current operation based on the standard operating procedure stored in the standard operating procedure storing unit 41. It is desired that the part/tool identifying unit 33 use a color or shape of a tool in addition to the image feature amounts to determine a tool. This is because tools can be identified by colors in many cases in order to prevent a worker from taking a wrong tool. Further, the part/tool identifying unit 33 causes the part/tool display unit 23 to display the identified part and tool.

The operation abnormality detecting unit 34 is configured to use data acquired by the camera and other sensors to acquire a detail of the worker's current operation and determine the current operation as being abnormal when the acquired operation detail is not performed in accordance with the standard operating procedure stored in the standard operating procedure storing unit 41. Specifically, the operation abnormality detecting unit 34 acquires the image feature amounts for each frame of the image data taken by the camera, and determines that an operation abnormality has occurred when the acquired image feature amounts differ from image feature amounts of an action of the operation step being performed, which is identified by the operation step identifying unit 32, by a predetermined level or more.

The recovery action instruction generating unit 35 is configured to, when the operation abnormality detecting unit 34 determines that the operation is abnormal, replace apart of a sentence representing the operation detail determined as being abnormal based on a recovery action instruction generation model registered in a recovery action instruction generation model storing unit 45 to generate a sentence of a recovery action instruction detail. The recovery action instruction generating unit 35 then causes the recovery action instruction display unit 24 to display the sentence of the recovery action instruction detail.

The operation completion verifying unit 36 is configured to verify whether or not an operation step is complete for each operation step of the standard operating procedure. Specifically, the operation completion verifying unit 36 determines whether or not an operation step previous to the operation step being performed, which is identified by the operation step identifying unit 32, is complete.

To determine whether or not an operation is complete, the operation completion verifying unit 36 compares feature amounts of a part being an operation object contained in an image representing a completed state of a product at the time of completion of each operation step with image feature amounts of a part contained in a predetermined frame of the image data taken by the camera, and determines that the relevant operation is complete when similarity of a predetermined level or more is found. Further, to determine whether or not an operation is complete, the operation completion verifying unit 36 compares an action of each operation step and the worker's action included in the image data taken by the camera, and determines that the relevant operation is complete when similarity of a predetermined level or more is found. With this configuration, the operation completion verifying unit 36 can treat an operation as a completed operation when a predetermined operation action has been performed for the operation or when the operation has been complete and is in an operation completed state.

The graph generating unit 37 is configured to aggregate information relating to the operation abnormality for each worker to generate a predetermined graph relating to a plurality of workers. Specifically, every time the operation abnormality occurs, the graph generating unit 37 stores in the storage unit 40 information such as a date and time at which the operation abnormality occurred, the relevant operation step, the relevant worker, and the type of operation abnormality. Further, in order to identify an operation step in which a large number of workers cause an operation abnormality, the graph generating unit 37 generates a graph for showing an operation step in which a large number of operation abnormalities have occurred.

The control unit 30 has an existing processing function (not shown) particularly for displaying a GUI screen on the display unit 20 such as a display, a smart watch, a head-mounted display, or VR goggles in a Web page format through use of a known element such as an OS, middleware, or an application.

The storage unit 40 is configured to store the standard operating procedure, various types of models (various types of image determination algorithms), and corresponding data (e.g., a database and a table). Those data, programs, and others may be acquired or referred to from the outside via a communication network.

The storage unit 40 stores the standard operating procedure storing unit 41, an operation detail acquisition model storing unit 42, a part/tool retrieval model storing unit 43, an operation abnormality detection model storing unit 44, the recovery action instruction generation model storing unit 45, a recovery action instruction storing unit 46, and an operation object storing unit 47.

Figure 2:
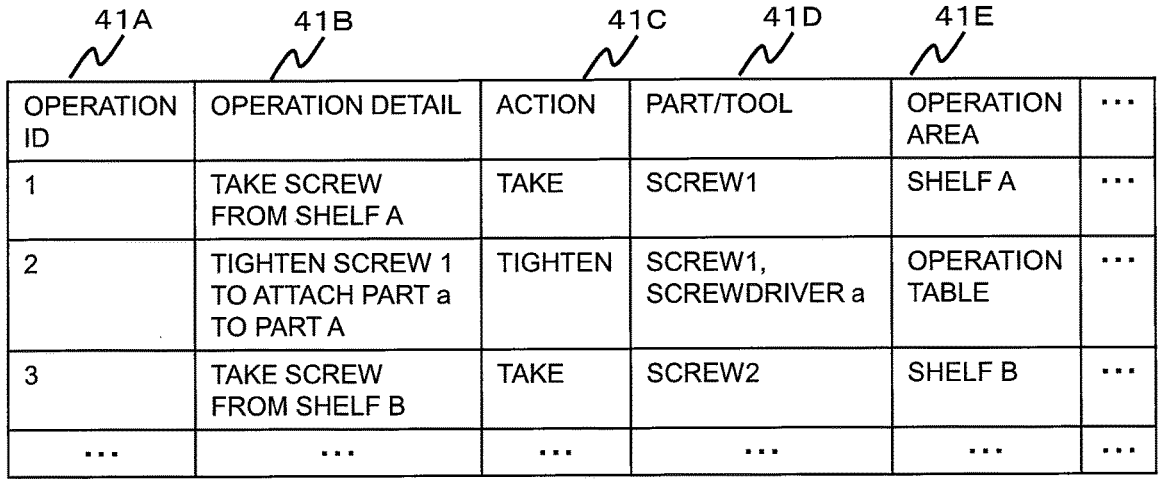
FIG. 2 is a table for showing a data structure stored in a standard operating procedure storing unit.

FIG. 2 is a table for showing a data structure stored in the standard operating procedure storing unit 41. The standard operating procedure storing unit 41 stores in association with one another an operation ID 41A specifying an operation step, an operation detail 41B being a sentence representing an operation detail, an action 41C being an element operation relating to the operation represented by the operation detail 41B, a part/tool 41D to be used in the relevant operation, and an operation area 41E in which the relevant operation is to be performed. The action 41C being the element operation stores information identifying any one of the actions defined in advance. For example, the action 41C stores information identifying an action such as "take (apart)", "tighten (a screw)", or "weld (a part)".

FIG. 3 is a table for showing a data structure stored in the operation detail acquisition model storing unit 42. The operation detail acquisition model storing unit 42 stores data acquired through use of a general machine learning method from time-series image feature amounts, which are generated through use of data including an image acquired from the camera and other sensors and a depth of the image, as a model for acquiring an operation detail. The operation detail acquisition model storing unit 42 stores a frame 42A specifying an image frame, and predetermined feature amounts including a brightness of camera 1 42B and a number of corners of camera 1 42C, which are acquired by a camera 1, and a maximum temperature of temperature sensor 1 42D acquired by a temperature sensor 1.

FIG. 4 is a table for showing a data structure stored in the part/tool retrieval model storing unit 43. The part/tool retrieval model storing unit 43 stores a part/tool retrieval model to be used when executing a processing flow of part/tool retrieval processing illustrated in FIG. 10. The part/tool retrieval model storing unit 43 stores in association with one another an item ID 43A specifying a part or a tool, a color 43B specifying a color of the tool, a brightness 43C specifying brightness of the part or tool, and an identification algorithm 43D. The identification algorithm 43D is an algorithm for performing image processing for identifying a part or tool contained in the image.

The operation abnormality detection model storing unit 44 stores an operation abnormality detection model (e.g., a function implementing an algorithm) for determining whether or not there is an abnormality in an action and detecting the action as an operation abnormality when there is an abnormality. In this embodiment, the operation is determined as being abnormal when the worker performs an action that differs from a predetermined action. Interruption of an action caused by waiting or the like and the speed of an action being high or low are not determined as an abnormality.

FIG. 5 is a table for showing a data structure stored in the recovery action instruction generation model storing unit 45. The recovery action instruction generation model storing unit 45 stores, for each action of the operation, a generation rule for a recovery instruction sentence in association with the action. More specifically, the recovery action instruction generation model storing unit 45 stores in association with one another a recovery ID 45A specifying a combination of a generation rule and an action, an action 45B, and a recovery instruction sentence generation rule 45C. The recovery instruction sentence generation rule 45C stores, for example, a rule "replace 'take' with 'return' and 'from' with 'to'" and a character string replacement rule "replace 'tighten screw' with 'remove screw' and 'attach . . . to' with 'detach . . . from'".

FIG. 6 is a table for showing a data structure stored in the recovery action instruction storing unit 46. The recovery action instruction storing unit 46 stores a recovery action instruction along with its display order. More specifically, the recovery action instruction storing unit 46 stores a display order 46A, an action instruction 46B, and an action execution confirmation algorithm 46C.

The display order 46A is information specifying an order in which the recovery action instruction is displayed. When a plurality of operation abnormalities have occurred at the same time, it is more efficient in many cases to give the recovery action instruction first from a recovery action for the operation abnormality that has occurred last. It is thus desired that display order control be performed on a so-called last-in, first-out (LIFO) basis. The action instruction 46B stores a sentence for instructing an action. It is desired that the action instruction 46B store the sentence for instructing an action generated by the recovery action instruction generating unit 35. The action execution confirmation algorithm 46C stores information specifying an algorithm for determining whether or not an action corresponding to the action instruction 46B has been performed.

Figure 7:
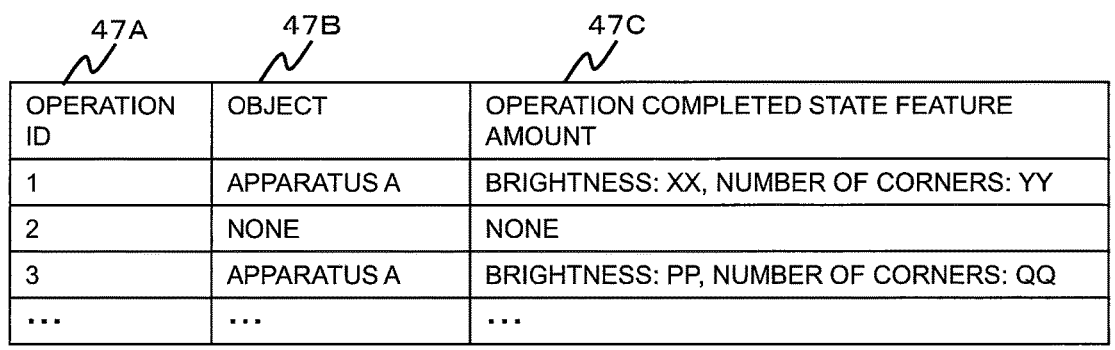
FIG. 7 is a table for showing a data structure stored in an operation object storing unit.

FIG. 7 is a table for showing a data structure stored in the operation object storing unit 47. The operation object storing unit 47 stores, for each operation, feature amounts on an image of an object of the operation in an operation completed state. More specifically, the operation object storing unit 47 stores an operation ID 47A, an object 47B, and an operation completed state feature amount 47C. The operation completed state feature amount 47C stores, for example, image feature amounts "brightness: XX, number of corners: YY".

Figure 8:
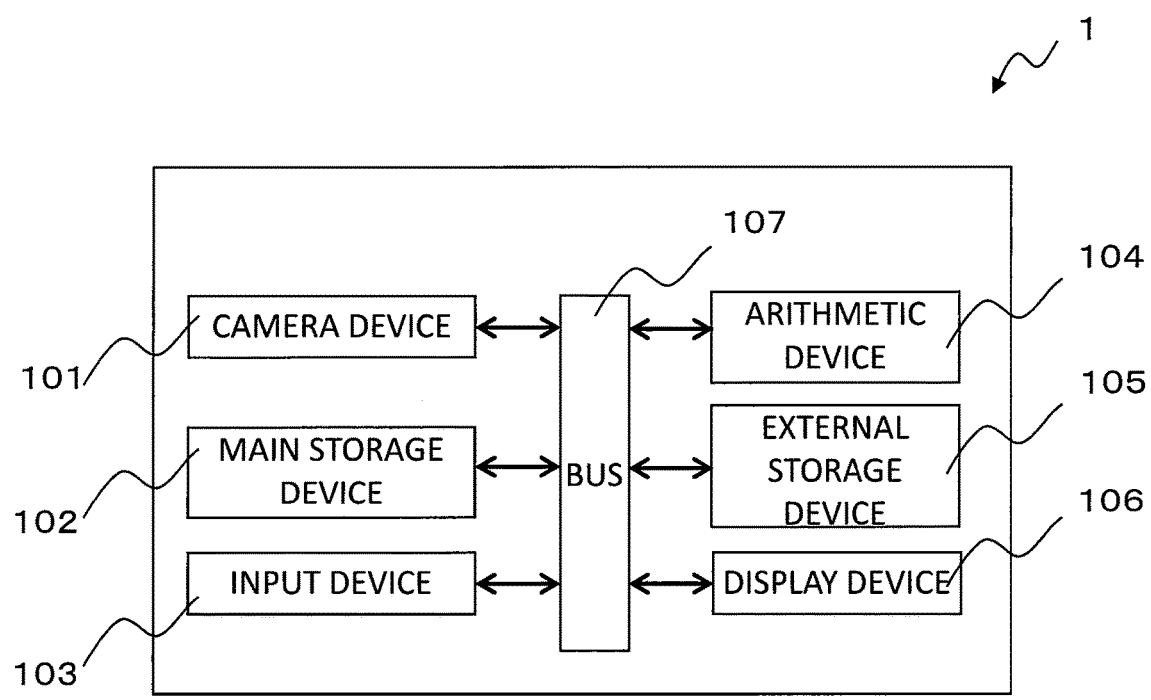
FIG. 8 is a diagram for illustrating a hardware configuration of the action instruction apparatus.

FIG. 8 is a diagram for illustrating a hardware configuration of the action instruction apparatus 1. The action instruction apparatus 1 includes a camera device 101, a main storage device 102, for example, a memory, an input device 103, an arithmetic device 104, for example, a central processing unit (CPU), an external storage device 105, for example, a hard disk drive or a solid state drive (SSD), a display device 106, and a bus 107 connecting those devices to one another.

The camera device 101 is a camera including an image pickup element and a lens.

The main storage device 102 is a memory, for example, a random access memory (RAM).

The input device 103 is a device configured to receive input via, for example, a keyboard having a predetermined layout, a touch pen or other various types of pointing devices, or a pressure sensitive touch sensor or a capacitive touch sensor arranged on a liquid crystal screen or an organic EL display being the display device 106.

The arithmetic device 104 is a device, for example, a CPU, configured to perform an arithmetic operation.

The external storage device 105 is a non-volatile storage device capable of storing digital information, for example, a so-called hard disk drive, SSD, or flash memory.

The display device 106 is a device configured to perform display, for example, a liquid crystal display or an organic EL display.

The above-mentioned operation instruction processing unit 31, operation step identifying unit 32, part/tool identifying unit 33, operation abnormality detecting unit 34, recovery action instruction generating unit 35, operation completion verifying unit 36, and graph generating unit 37 are implemented by programs for causing the arithmetic device 104 to perform corresponding processing. Those programs are stored in the main storage device 102 or the external storage device 105, and are loaded onto the main storage device 102 for execution and executed by the arithmetic device 104.

Further, the standard operating procedure storing unit 41, the operation detail acquisition model storing unit 42, the part/tool retrieval model storing unit 43, the operation abnormality detection model storing unit 44, the recovery action instruction generation model storing unit 45, the recovery action instruction storing unit 46, and the operation object storing unit 47 are implemented by the main storage device 102 and the external storage device 105.

Further, the display unit 20 is implemented by the display device 106, and the input/output unit 10 is implemented by the camera device 101, the input device 103, and the display device 106.

The above-mentioned configuration is the hardware configuration example of the action instruction apparatus 1 according to this embodiment. However, the hardware configuration of the action instruction apparatus 1 is not limited thereto, and the action instruction apparatus 1 may be constructed through use of other hardware components.

The action instruction apparatus 1 may include known elements (not shown) such as an operating system (OS), middleware, and an application.

[Description of Operation]

Figure 9:
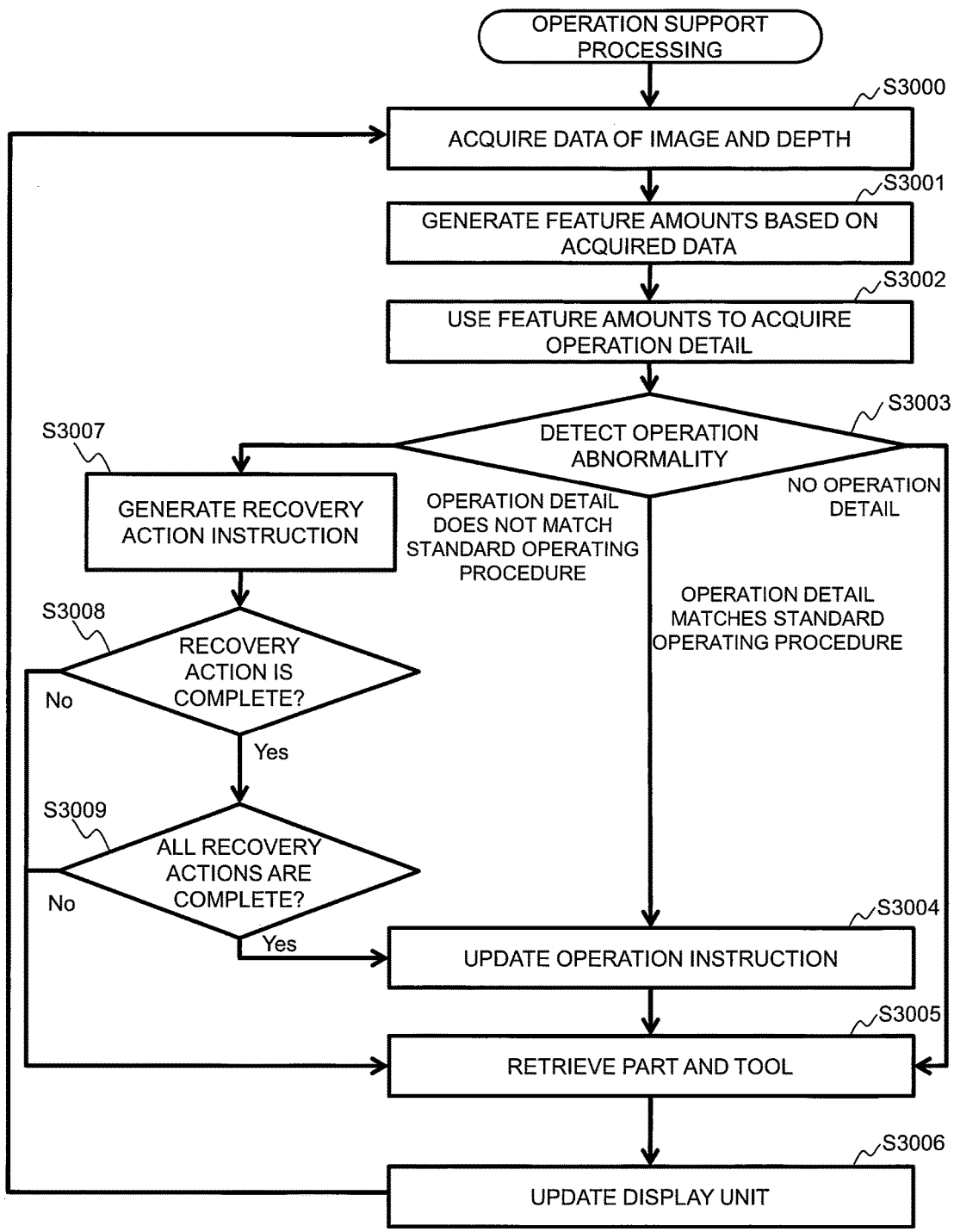
FIG. 9 is a diagram for illustrating an operation flow of operation support processing.

FIG. 9 is a diagram for illustrating an operation flow of operation support processing. The operation support processing is started when the action instruction apparatus 1 is activated.

First, the operation step identifying unit 32 acquires from the camera and other sensor devices data including an image and a depth (Step S3000).

The operation step identifying unit 32 then generates feature amounts based on the acquired data (Step S3001). A luminance distribution, the number of corners, an HOG feature amount, and other such feature amounts are conceivable as the feature amounts generated in this case. However, the feature amounts are not limited thereto, and only need to be predetermined feature amounts.

The operation step identifying unit 32 then uses the generated feature amounts and a known method, for example, machine learning to acquire an action of a worker (Step S3002). Specifically, the operation step identifying unit 32 stores the generated feature amounts of each frame in the operation detail acquisition model storing unit 42, and uses the action 41C and others of the standard operating procedure storing unit 41 to determine whether or not an operation detail of the acquired action is similar to any of the operation steps of the standard operating procedure, and acquires a similar operation detail as the action of the worker.

The operation abnormality detecting unit 34 then reads out from the operation abnormality detection model storing unit 44 a predetermined algorithm to be used for operation abnormality detection to detect an operation abnormality (Step S3003). Specifically, when the operation abnormality detecting unit 34 failed to acquire the action of the worker in Step S3002, the operation abnormality detecting unit 34 determines that there is no operation detail and advances the control to Step S3005 described later. When the acquired action matches any of the operation steps of the standard operating procedure or is similar thereto except for a difference in length of time, for example, when a part and a tool to be used both match but a position to which a tool or the like has been moved or a length of time that has been taken to move the tool or the like differs, the operation abnormality detecting unit 34 advances the control to Step S3004 described later. When the acquired action is similar to any of the operation steps of the standard operating procedure and there is a dissimilar element other than the length of time, for example, when a part or tool to be used differs, the operation abnormality detecting unit 34 advances the control to Step S3007 described later.

When the acquired action matches any of the operation steps of the standard operating procedure or is similar thereto except for a difference in length of time (when "operation detail matches standard operating procedure" in Step S3003), the operation instruction processing unit 31 updates an operation instruction (Step S3004). Specifically, the operation instruction processing unit 31 commands, based on the standard operating procedure stored in the standard operating procedure storing unit 41, the operation instruction display unit 22 to display an instruction of an operation to be performed next by the worker.

The part/tool identifying unit 33 then performs the part/tool retrieval processing (Step S3005). Specifically, the part/tool identifying unit 33 uses the data including the image and the depth acquired from the camera and other sensor devices to identify a part and tool to be used in the operation being performed through use of information on a part and tool, which is stored in the part/tool retrieval model storing unit 43.

The operation image display unit 21, the operation instruction display unit 22, and the part/tool display unit 23 then update what is displayed on the display unit 20 (Step S3006).

The operation instruction processing unit 31 then returns the control to Step S3000.

When the acquired action is similar to any of the operation steps of the standard operating procedure and there is a dissimilar element other than the length of time (when "operation detail does not match standard operating procedure" in Step S3003), the recovery action instruction generating unit 35 generates a recovery action instruction (Step S3007). Specifically, the recovery action instruction generating unit 35 performs recovery action instruction generation processing described later to generate the recovery action instruction and commands the recovery action instruction display unit 24 to display the generated recovery action instruction.

The operation step identifying unit 32 then determines whether or not the recovery action is complete (Step S3008). Specifically, the operation step identifying unit 32 refers to the recovery action instruction storing unit 46 to identify the action execution confirmation algorithm through use of the information stored in the action execution confirmation algorithm 46C, and determines based on the algorithm whether or not the recovery action is complete through use of the information including the image and the depth, which is acquired from the camera and other sensor devices. When the recovery action is not complete, the operation step identifying unit 32 advances the control to Step S3005.

When the recovery action is complete ("Yes" in Step S3008), the operation step identifying unit 32 determines whether or not all the other recovery actions are complete (Step S3009). When not all the other recovery actions are complete, the operation step identifying unit 32 advances the control to Step S3005.

When all the other recovery actions are complete ("Yes" in Step S3009), the operation step identifying unit 32 advances the control to Step S3004.

The above-mentioned processing is the operation flow of the operation support processing. According to the operation support processing, when an abnormality (taking a wrong part or tool) is found in the action of the worker, it is possible to detect the abnormality and immediately display a predetermined recovery action instruction. Further, when a recovery action is performed, it is possible to display an operation instruction that is displayed at the normal time. It is therefore possible to enable the worker to immediately realize an operation abnormality and correct the abnormality.

In the operation support processing, not only a recovery action instruction for one operation abnormality but also a recovery action instruction for another operation abnormality that has occurred after the one operation abnormality can be generated. For example, even when the worker has taken a tool that differs from a tool to be used in the recovery action, an action that differs from the recovery action is detected as an operation abnormality through operation abnormality detection processing. In this manner, it is possible to give a recovery instruction to switch the wrong tool to a correct tool.

Further, in parallel to and separately from the operation support processing, the operation completion verifying unit 36 may determine whether or not the operation completed state feature amount 47C stored in the operation object storing unit 47 is satisfied through use of the data including the image and the depth, which is acquired from the camera and other sensor devices, to confirm whether or not the operation step is complete during the execution of a subsequent operation step. With this configuration, for example, the completion of an action for which the operation completion cannot be confirmed because the action is in a blind area of the camera can be confirmed at the time when an image enabling the completion of the action to be confirmed is acquired during the execution of the subsequent operation.

Figure 10:
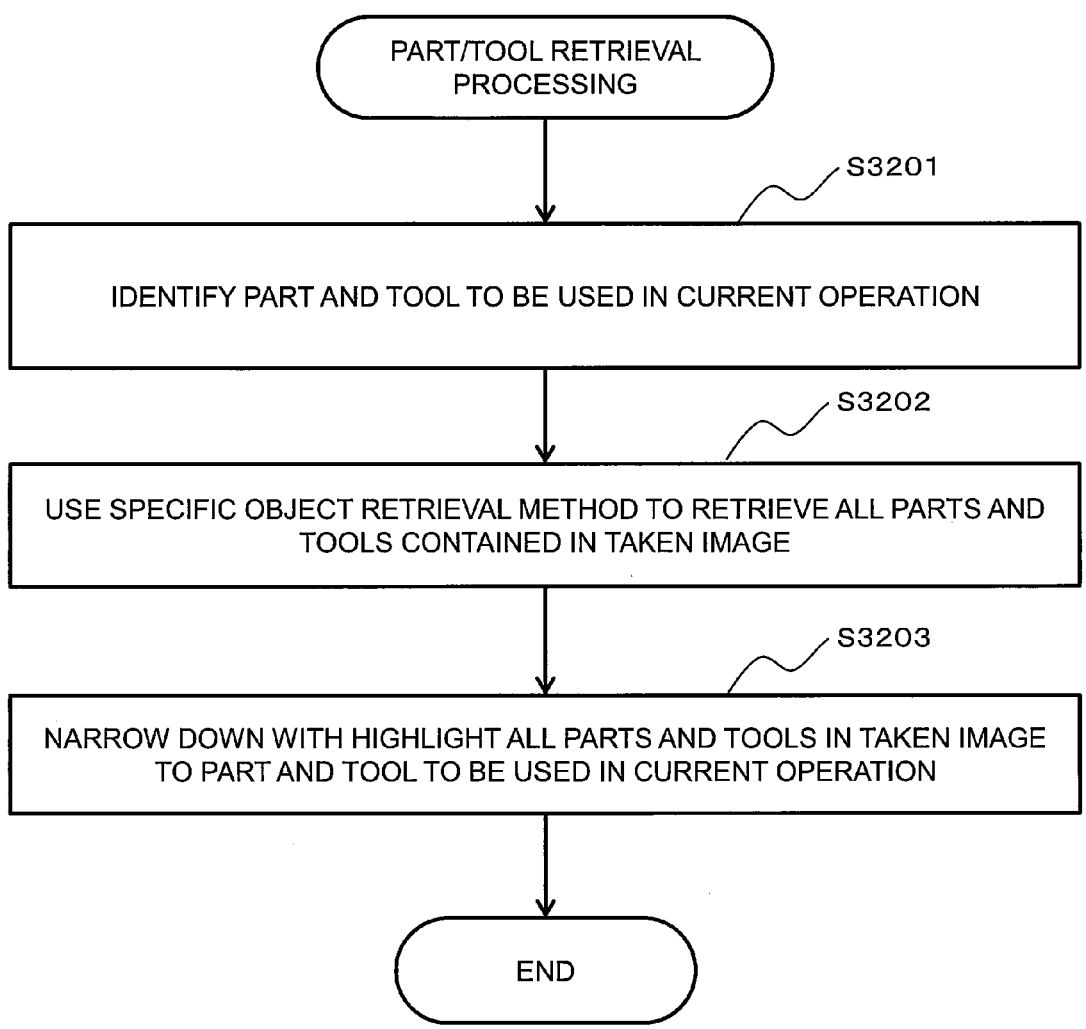
FIG. 10 is a diagram for illustrating an operation flow of part/tool retrieval processing.

FIG. 10 is a diagram for illustrating an example of an operation flow of the part/tool retrieval processing. The part/tool retrieval processing is performed in Step S3005 of the operation support processing.

First, based on the standard operating procedure stored in the standard operating procedure storing unit 41, the part/tool identifying unit 33 identifies from the action instructed in Step S3004 a part and tool to be used in the current operation (Step S3201).

The part/tool identifying unit 33 then uses a specific object retrieval method to retrieve all parts and tools in the taken image (Step S3202). At the time of the retrieval, the part/tool identifying unit 33 uses the identification algorithm 43D stored in the part/tool retrieval model storing unit 43 to identify as a part or a tool an image having HOG feature amounts such as the color 43B and the brightness 43C.

The part/tool identifying unit 33 narrows down with a highlight all parts and tools in the taken image to the part and tool to be used in the current operation (Step S3203). Specifically, the part/tool identifying unit 33 uses as feature amounts the part and tool to be used in the current operation, which is identified in Step S3201, and a measure in the part or tool for preventing a worker from taking a wrong part or tool (poka-yoke (mistake proofing)) (e.g., using different shapes or colors for screwdrivers to enable distinction among the screwdrivers) to narrow down all parts or tools in the taken image to the part or the tool to be used in the current operation. The part/tool identifying unit 33 then commands the part/tool display unit 23 to display the narrowed-down part and tool.

The above-mentioned processing is the operation flow of the part/tool retrieval processing. According to the part/tool retrieval processing, the part or the tool to be used in the current operation can be highlighted on the image. The worker can avoid taking a wrong part or tool through use of the part or tool displayed on the image.

Figure 11:
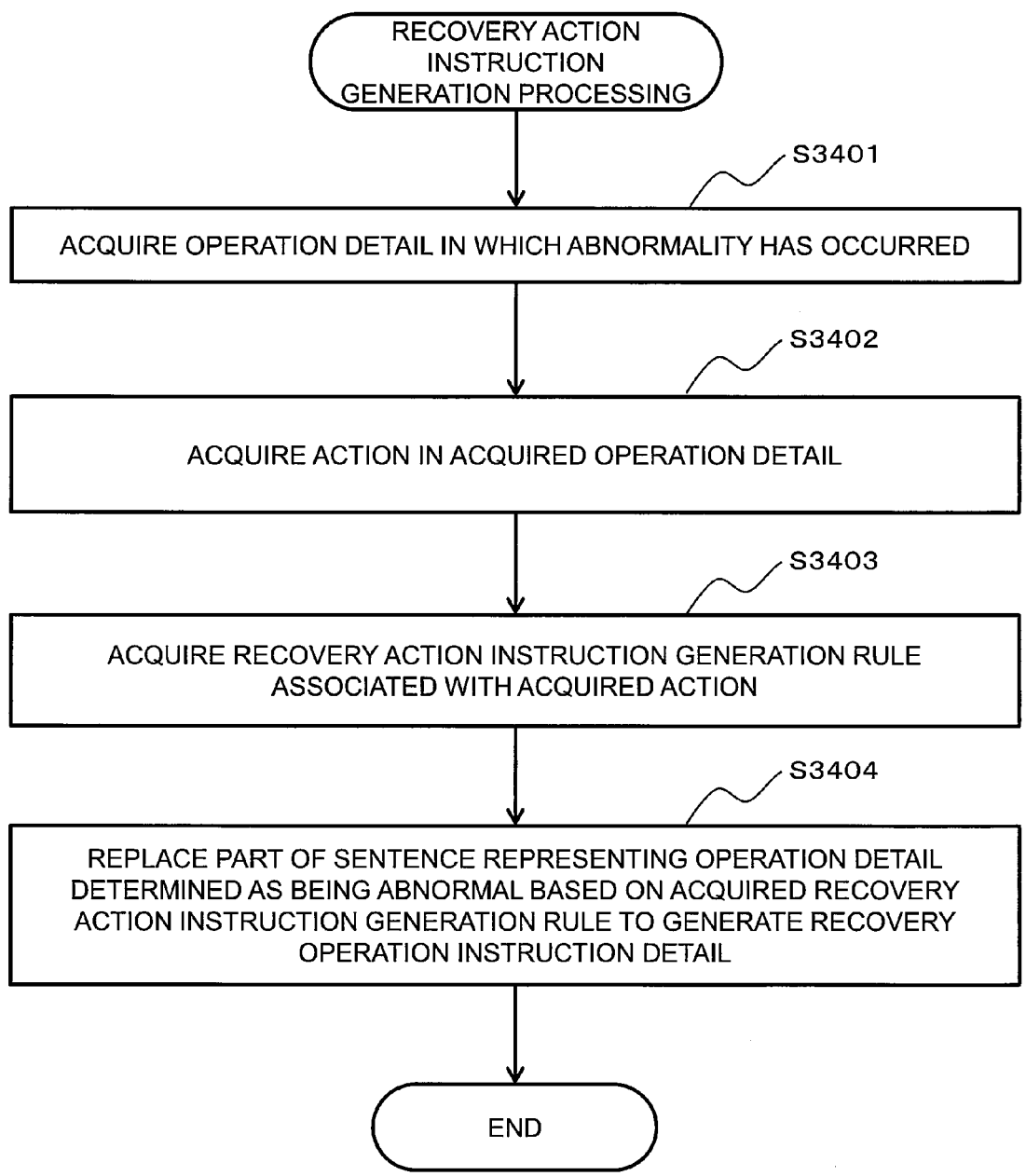
FIG. 11 is a diagram for illustrating an operation flow of recovery action instruction generation processing.

FIG. 11 is a diagram for illustrating an operation flow of the recovery action instruction generation processing. The recovery action instruction generation processing is performed in Step S3007 of the operation support processing.

First, the recovery action instruction generating unit 35 acquires the operation detail in which the abnormality has occurred (Step S3401). Specifically, the recovery action instruction generating unit 35 acquires the operation detail acquired in Step S3002 of the operation support processing.

The recovery action instruction generating unit 35 then acquires the action in the acquired operation detail (Step S3402). Specifically, the recovery action instruction generating unit 35 acquires the action 41C of the standard operating procedure storing unit 41 in the acquired operation detail.

The recovery action instruction generating unit 35 then acquires a recovery action instruction generation rule associated with the acquired action (Step S3403). Specifically, the recovery action instruction generating unit 35 uses the action acquired in Step S3402 to retrieve the action 45B of the recovery action instruction generation model storing unit 45, and reads out and acquires the recovery instruction sentence generation rule 45C matching the retrieved action.

The recovery action instruction generating unit 35 then replaces a part of the sentence representing the operation detail determined as being abnormal based on the acquired recovery action instruction generation rule to generate a recovery action instruction detail (Step S3404). When an action in which the abnormality has occurred is an irreversible action such as soldering, cutting, removing, or bonding, an action of simply returning an operation object to the original state is not appropriate in many cases. For such an action, the sentence stored in the recovery action instruction generation rule may be replaced with a sentence instructing to discard or replace the operation object. With this configuration, it is possible to instruct an appropriate recovery action that takes into consideration the difference in type of action, for example, whether the action is a reversible action or an irreversible action.

The above-mentioned processing is the operation flow of the recovery action instruction generation processing. According to the recovery action instruction generation processing, a sentence for instructing a recovery action can be obtained for an operation detail in which an abnormality has occurred through character string replacement in accordance with a predetermined rule for recovery.

Figure 12:
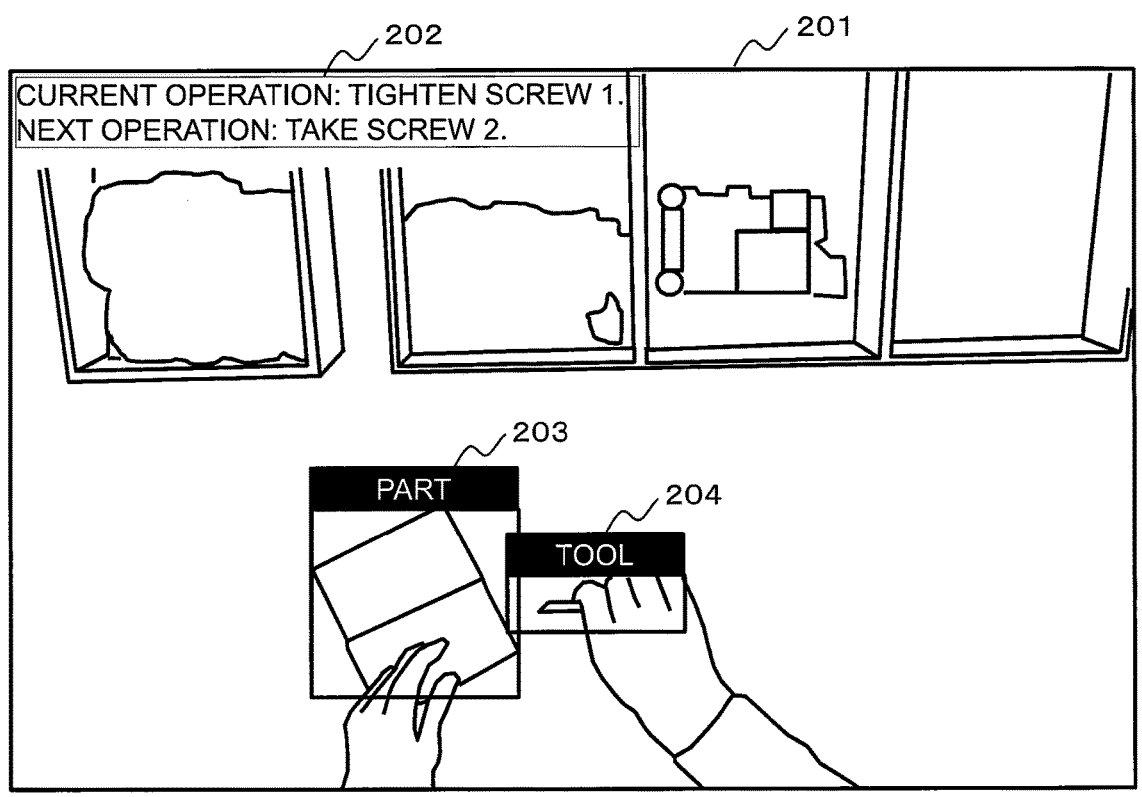
FIG. 12 is a diagram for illustrating an example of an output screen that is output by the operation support processing.

FIG. 12 is a diagram for illustrating an example of an output screen that is output by the operation support processing. Specifically, FIG. 12 is an illustration of a state in which what is displayed on the display unit 20 is updated in Step S3006 of the operation support processing. In FIG. 12, the display unit 20 includes an operation image display region 201 being a taken image of a predetermined range of the worker's operation table, an operation instruction display region 202 for displaying an operation instruction sentence, a part display region 203 to be superimposed and highlighted onto a part being an operation object, and a tool display region 204 to be superimposed and highlighted onto a tool being an operation object. This output screen enables the worker to confirm an operation instruction to easily find a necessary part and tool for his or her operation.

Figure 13:
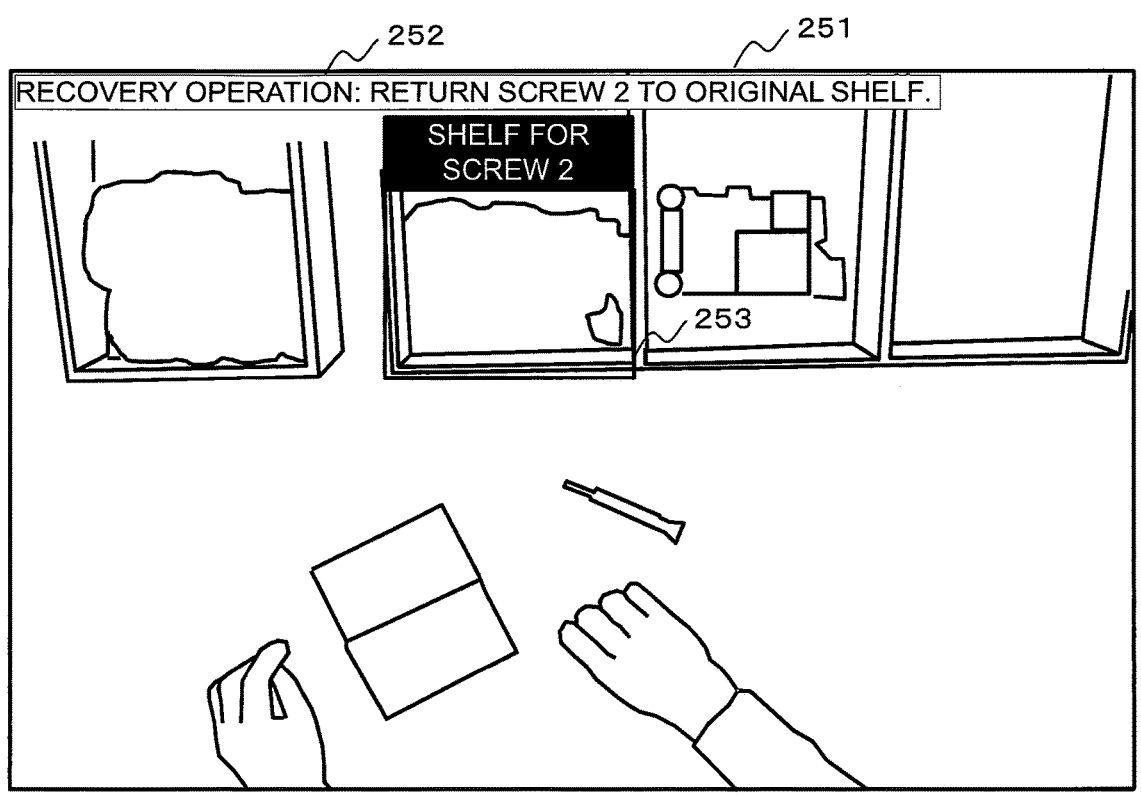
FIG. 13 is a diagram for illustrating an example of an output screen for outputting a recovery action instruction.

FIG. 13 is a diagram for illustrating an example of an output screen for outputting a recovery action instruction. Specifically, FIG. 13 is an illustration of a state in which what is displayed on the display unit 20 is updated in Step S3007 of the operation support processing. In FIG. 13, the display unit 20 includes an operation image display region 251 being a taken image of a predetermined range of the worker's operation table, a recovery action instruction display region 252 for displaying a recovery action instruction sentence, and a recovery part display region 253 to be superimposed and highlighted onto a part corresponding to a recovery action target. This output screen enables the worker to confirm a recovery action instruction to easily find a necessary part or tool for his or her recovery action.

Although the action instruction apparatus 1 according to the embodiment of the present invention has been specifically described above, the present invention is not limited to the above-mentioned embodiment. It should be understood that various modifications can be made within the scope of the gist of the present invention.

For example, as another embodiment, through use of the camera and the temperature sensor, an appropriate temperature of a soldering iron may be included in an operation action. In this case, when soldering is performed at an inappropriate soldering temperature, an action of adjusting such an inappropriate temperature to an appropriate temperature is instructed as a recovery action. In this manner, it becomes easier to avoid various types of defects caused by a soldering operation.

Further, for example, for one operation action, images may be taken from different viewpoints by a plurality of cameras to identify an action. In other words, an operation abnormality may be detected based on whether or not image feature amounts of images taken by the plurality of cameras are all similar to each other. With this configuration, more detailed operation abnormality can be detected, leading to finer productivity enhancement, for example, giving an instruction as to how to move the body more efficiently.

Further, for example, images of actions of a plurality of workers may be taken by one camera, and a region on the image may be divided into regions for the respective workers to detect respective operation abnormalities. With this configuration, the number of cameras to be installed can be reduced, and hence the system can be constructed at low cost.

Further, for example, the action instruction apparatus is not limited to the one to be used for manufacturing operations, and may be used for various types of action instructions. Specifically, the action instruction apparatus may be applied as driving action support for means of transportation involving a driving operation, such as a vehicle, a train, a hovercraft, a ship, an airplane, or a space shuttle. In this case, an instruction as to when to perform an action may be given during the driving action support based on a position, direction, velocity, and the like of the means of transportation.

In the above-mentioned embodiment, the configurations are described in detail in order to clearly describe the present invention, but the present invention is not necessarily limited to an embodiment that includes all the configurations that have been described.

Further, in regard to each of the above-mentioned configurations, functions, processing units, and the like, a part thereof or an entirety thereof may be implemented by hardware, for example, by being designed as an integrated circuit. Further, control lines and information lines that are assumed to be necessary for the sake of description are illustrated, but not all the control lines and the information lines on a product are illustrated. In actuality, it may be considered that almost all the components are connected to one another.

Further, the above-mentioned configurations, functions, processing units, and the like may be implemented as a distributed system by, for example, executing a part or all of the configurations, functions, processing units, and the like by another apparatus and integrating the execution results via a network.

Further, technical elements of the above-mentioned embodiment may be applied alone, or may be applied by being divided into a plurality of portions such as program parts and hardware parts.

The embodiment of the present invention has been mainly described above.

REFERENCE SIGNS LIST

1 . . . action instruction apparatus, 10 . . . input/output unit, 20 . . . display unit, 21 . . . operation image display unit, 22 . . . operation instruction unit, 23 . . . part/tool display unit, 24 . . . recovery action instruction display unit, 30 . . . control unit, 31 . . . operation instruction processing unit, 32 . . . operation step identifying unit, 33 . . . part/tool identifying unit, 34 . . . operation abnormality detecting unit, 35 . . . recovery action instruction generating unit, 36 . . . operation completion verifying unit, 37 . . . graph generating unit, 40 . . . storage unit, 41 . . . standard operating procedure storing unit, 42 . . . operation detail acquisition model storing unit, 43 . . . part/tool retrieval model storing unit, 44 . . . operation abnormality detection model storing unit, 45 . . . recovery action instruction generation model storing unit, 46 . . . recovery action instruction storing unit, 47 . . . operation object storing unit

What is claimed is:

1. An action instruction apparatus, comprising:
   a standard operating procedure storing unit configured to store, for each operation step, output information from a predetermined sensor relating to a standard action of a worker;
   an operation step identifying unit configured to acquire output information from the predetermined sensor relating to an operation being performed by the worker and to compare the acquired output information with the standard action stored in the standard operating procedure storing unit to identify an operation step being performed;
   an operation abnormality detecting unit configured to acquire output information from the predetermined sensor relating to an operation step subsequent to the operation step being performed by the worker to detect an operation abnormality when the acquired output information differs from the output information in the operation step subsequent to the operation step being performed;
   a recovery action instruction generating unit configured to generate an operation instruction detail for recovery when the operation abnormality is detected; and
   an operation instruction display unit configured to preferentially display the operation instruction detail for recovery generated last when there are a plurality of unexecuted operation instruction details for recovery generated by the recovery action instruction generating unit.

2. An action instruction apparatus according to claim 1, further comprising:
   a part/tool retrieval model storing unit configured to store information specifying a feature amount of output information from the predetermined sensor relating to a predetermined part and tool; and
   a part/tool identifying unit configured to acquire output information from the predetermined sensor relating to the operation being performed by the worker and to compare the acquired output information with the feature amount stored in the part/tool retrieval model storing unit to identify a part and a tool relating to the operation step being performed,
   wherein the part/tool identifying unit is configured to identify the part and the tool relating to the operation step being performed based on one of a color and a shape.

3. An action instruction apparatus according to claim 1, wherein the recovery action instruction generating unit is configured to generate the operation instruction detail for recovery by replacing text for an operation instruction in the operation step in accordance with a predetermined rule.

4. An action instruction apparatus according to claim 1, wherein the operation abnormality detecting unit is configured to acquire the output information from the predetermined sensor relating to the operation being performed by the worker to detect an operation abnormality when the acquired output information differs from output information from the predetermined sensor in an operation step relating to the operation instruction detail for recovery.

5. An action instruction apparatus according to claim 1, wherein the operation abnormality detecting unit is configured to acquire the output information from the predetermined sensor relating to the operation being performed by the worker to detect an operation abnormality when the acquired output information differs from the output information in an operation step relating to the operation instruction detail for recovery.

6. An action instruction apparatus according to claim 1, further comprising a graph generating unit configured to aggregate information relating to the operation abnormality for each worker to generate a predetermined graph relating to a plurality of the workers.

7. An action instruction apparatus according to claim 1, further comprising:
   an operation object storing unit configured to store output information on an operation object relating to the operation from the predetermined sensor for each operation step; and
   an operation completion verifying unit configured to acquire the output information from the predetermined sensor relating to the operation being performed by the worker and to compare the acquired output information with the output information stored in the operation object storing unit to verify whether or not an operation previous to the operation being performed is complete.

* * * * *